US011164358B2

(12) United States Patent
Lyu et al.

(10) Patent No.: US 11,164,358 B2
(45) Date of Patent: Nov. 2, 2021

(54) METHOD FOR REAL-TIME RENDERING OF GIGA-PIXEL IMAGES

(71) Applicant: PLEX-VR DIGITAL TECHNOLOGY (SHANGHAI) CO., LTD., Shanghai (CN)

(72) Inventors: Wentao Lyu, Shanghai (CN); Yingliang Zhang, Shanghai (CN); Anpei Chen, Shanghai (CN); Minye Wu, Shanghai (CN)

(73) Assignee: PLEX-VR DIGITAL TECHNOLOGY (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/970,632

(22) PCT Filed: Sep. 23, 2019

(86) PCT No.: PCT/CN2019/107226
§ 371 (c)(1),
(2) Date: Aug. 18, 2020

(87) PCT Pub. No.: WO2020/063516
PCT Pub. Date: Apr. 2, 2020

(65) Prior Publication Data
US 2021/0090316 A1    Mar. 25, 2021

(30) Foreign Application Priority Data

Sep. 25, 2018  (CN) .......................... 201811117338.X

(51) Int. Cl.
*G06T 15/00* (2011.01)
*G06F 9/48* (2006.01)
*G06T 1/60* (2006.01)

(52) U.S. Cl.
CPC .......... *G06T 15/005* (2013.01); *G06F 9/4881* (2013.01); *G06T 1/60* (2013.01)

(58) Field of Classification Search
CPC ......... G06T 15/005; G06T 1/60; G06T 15/04; G06F 9/4881
See application file for complete search history.

(56) References Cited

U.S. PATENT DOCUMENTS 6,148,333 A  * 11/2000 Guedalia ............. G06F 11/3409
                                                       709/219
7,961,983 B2 *  6/2011 Uyttendaele .......... G06T 3/4038
                                                       382/294
(Continued)

FOREIGN PATENT DOCUMENTS

CN         1753033 A     3/2006
CN       102663119 A     9/2012
(Continued)

OTHER PUBLICATIONS

Kopf, J. et al., Capturing and Viewing Gigapixel Images, ACM Transactions on Graphics, vol. 26, Issue 3, Jul. 2007, Published Jul. 29, 2007. (Year: 2007).*

(Continued)

*Primary Examiner* — Maurice L. McDowell, Jr.
*Assistant Examiner* — Donna J. Ricks
(74) *Attorney, Agent, or Firm* — Winston Hsu

(57) ABSTRACT

The present invention discloses a method for real-time rendering of giga-pixel images. Image data are subject to offline pre-processing, and then are subject to data decoding and redirection through a decoding module. A corresponding scheduling strategy is determined according to different image inputs, and rendering is executed by a renderer. The present invention may realize the real-time rendering of a giga-pixel panoramic view in a conventional display device, to greatly reduce the resource allocated for rendering of (Continued)

giga-pixel images. The present invention may render an image originally requiring a 40G or more video memory capacity on a common video card with a 1G-4G video memory capacity.

10 Claims, 1 Drawing Sheet

(56) References Cited

U.S. PATENT DOCUMENTS

| | | | | |
|---|---|---|---|---|
| 8,731,320 | B2* | 5/2014 | Leitao | G06T 5/00 382/260 |
| 2015/0178881 | A1* | 6/2015 | Qian | G06K 15/1857 345/505 |
| 2017/0366814 | A1 | 12/2017 | Adsumilli | |
| 2018/0300854 | A1* | 10/2018 | Dmitrenko | G06T 15/04 |
| 2018/0308455 | A1* | 10/2018 | Hicks | G06F 3/013 |

FOREIGN PATENT DOCUMENTS

| | | | | |
|---|---|---|---|---|
| CN | 105678681 A | 6/2016 | | |
| CN | 106446351 A | 2/2017 | | |
| HU | 0105452 A2 * | 6/2003 | | G06T 3/00 |
| WO | WO-2017024144 A1 * | 2/2017 | | G09G 5/393 |

OTHER PUBLICATIONS

S. McCain, S. Feller, and D. Brady, "Gigapixel Television," in Imaging and Applied Optics 2016, OSA Technical Digest (online) (Optical Society of America, 2016), paper CTh3B.5 (Year: 2016).*

Xiaoyun Yuan, Lu Fang, Qionghai Dai, David J Brady, and Yebin Liu. 2017. Multiscale gigapixel video: A cross resolution image matching and warping approach. In 2017 IEEE International Conference on Computational Photography (ICCP). IEEE, 1-9. (Year: 2017).*

* cited by examiner

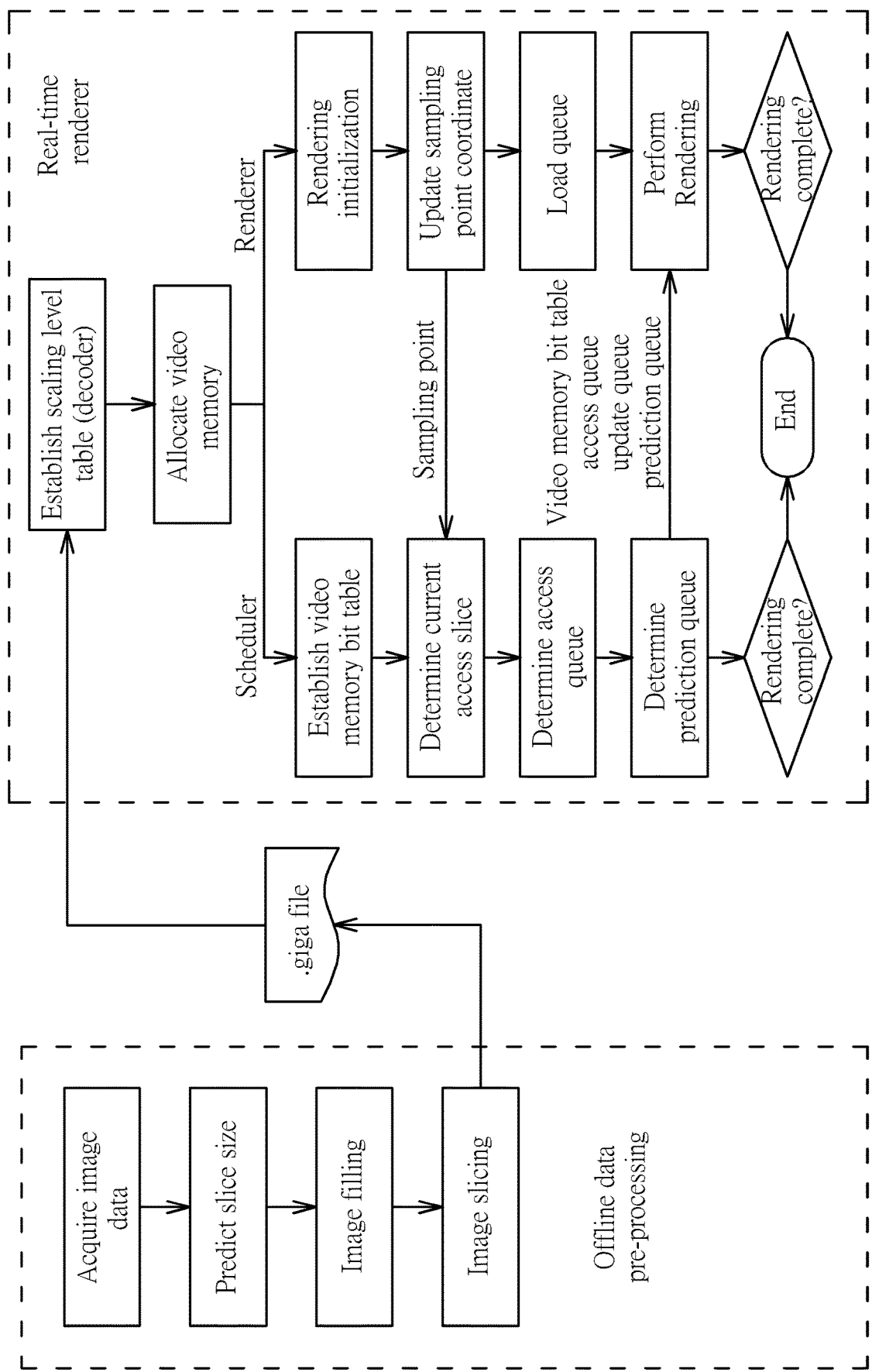

METHOD FOR REAL-TIME RENDERING OF GIGA-PIXEL IMAGES

BACKGROUND OF THE INVENTION

1. Field of the Invention

The present invention relates to a field of image rendering, and more particular, to a method for real-time rendering of gigabit pixel images.

2. Description of the Prior Art

Image rendering is the process of converting three-dimensional light energy transmission into a two-dimensional image. Scenes and entities are represented in a three-dimensional form, which is closer to the real world and easy to manipulate and transform. Most of the graphic display devices are two-dimensional raster displays and dot-matrix printers. Representation of N-dimensional raster and rasterization from a three-dimensional entity scene is image rendering, i.e. rasterization. A raster display can be regarded as a pixel matrix. Any graphic displayed on the raster display is actually a collection of pixels with one or more colors and gray levels.

The work of image rendering is actually using the methods of geometric transformation, projection transformation, perspective transformation, and window cropping to generate the image from the obtained three-dimensional model information, and output the image information to an image file or a video file, or a frame buffer of a display device, complete the graphics generation.

The hardware that completes image rendering is the graphics processor. Early image processors includes simple memory and frame buffers. They actually only play a role of storing and transferring images. Image rendering is mainly done by the CPU. Especially for many large 3D graphics software, most of the time is performing rendering. Image rendering involves a large number of floating-point operations, such as changes in the position of three-dimensional entities, matrix operations required for various transformations, and various algorithms, such as ray tracing and radiosity, designed to pursue realism, which are a lot of work even for a current computer with good performance. Therefore, the graphics processors developed later have graphics processing functions. It not only stores graphics, but also can complete most graphics functions. This greatly reduces the burden on the CPU and improves the display capability and speed.

With the development of electronic technology, the technical content of graphics processors is getting higher and higher, and the functions are getting stronger and stronger. Many professional graphics processors already have strong 3D processing capabilities, and these 3D graphics cards are gradually moving towards personal computers. Some professional graphics processors have even more transistors than contemporary CPUs. For example, the GeForceFX chip sold by NVIDIA in November 2002 is called a vision processor and has 125 million transistors, which is twice as much as the contemporary Pentium 4 CPU (with 55 million transistors).

However, with the rapid development of hardware technology, people's demand for images is also increasing. At present, image pixels used for VR (virtual reality) technology have reached the gigabit level. Ordinary image processors can no longer directly render pixels of this level. In fact, the conventional personal computer's video memory is 1G-4G, and rendering gigabit-pixel images requires more than 40G of video memory space, and ordinary graphics cards cannot be loaded at all. In the prior art, solutions include GPU-accelerated cloud technology, virtual machine platforms with Docker container architecture, and so on, all relying on specific customized hardware or services, which result in High cost and high network requirements, and failing to implement real-time data scheduling.

Therefore, those skilled in the art are committed to developing a real-time rendering method for gigabit pixel images. This method is based on an algorithm built on system architecture optimization and real-time data scheduling to form a real-time rendering capability that responds to input of different image motions, so as to realize the rendering of gigabit pixels on conventional device platforms (rather than professional customized devices). The memory/video memory space configuration required by this method is also much smaller than the gigabit image size of the actual rendering target.

SUMMARY OF THE INVENTION

In view of the above-mentioned shortcomings of the prior art, the technical problem to be solved by the present invention is how to render a gigabit pixel panorama in real time on a conventional display device, or to greatly reduce the memory and video memory configuration required by rendering a gigabit pixel panorama.

To achieve the above object, the present invention provides a method for real-time rendering of a gigabit pixel image, the method includes following steps:

Step 1: performing offline data reorganization on the image through a data pre-processing module, and utilizing reorganized data to generate a data file with an extension name ".giga";

Step 2: performing data decoding and redirection of the data file through a data decoding module;

Step 3: generating a scheduling strategy through a scheduling module to determine a queue status of data in a memory and a video memory;

Step 4: executing the scheduling strategy through a rendering module, and updating the scheduling strategy during execution;

Step 5: repeating the steps 3 and 4 until the entire image is rendered.

Further, the data reorganization in step 1 includes image slicing, image filling, and file structure optimization; the image slicing divides a large image into small parts for faster loading and rendering at a software level; the image filling is adds specific data parameters before an overall data storage, and uses invalid placeholder data to ensure a memory offset position for each slice remains an integer multiple of 4 KiB; the file structure optimization adopts a file structure based on a memory hierarchy structure, to significantly reduces rendering costs through optimization.

Further, a specific scheme of the image slicing is to reduce an original-scale data image by a factor of two, and a result of each scaling is a scaling level image, a scaling level that is most suitable for a memory bandwidth is selected and defined as a scaling level 0, and each image of each scaling level is cut into a series of slices of a uniform size.

Further, the data decoding and the redirection in the step 2 includes establishing a scaling level table, that is, storing a starting position offset of each slice data at any scaling level in advance, thereby increasing a speed of operation of the redirection.

Further, at a specific scaling level, a starting position offset of an 0th slice data is calculated by a following formula:

$$o_l = \sum_{i=0}^{l-1} \mu^{2i}$$

$$= \begin{cases} 0 & l = 0 \\ o_{l-1} + \mu^{2(l-1)} & l \neq 0 \end{cases}$$

among them, l is a scaling level, $o_l$ is the starting position offset of the 0th slice under the scaling level l, and μ is a scaling factor.

Further, at the specific scaling level, a starting position offset of a t-th slice is calculated by a following formula:

$$o_{t,l} = (o_l + t) \times s$$

where $o_{t,l}$ is the starting position of the t-th slice data at a scaling level l, $o_l$ is the starting position offset of the 0th slice at the scaling level l, and s is a memory space occupied by a global slice size after aligning 4 KiB.

Further, the scheduling strategy in the step 3 comprises maintaining a video memory bit table, and the video memory bit table divides the video memory into a set of available video memory bits, the video memory bit table records slice information specifically stored by each video memory bit, the slice information comprises a slice number, whether the video memory bit is empty, and whether the video memory bit needs to be rendered.

Further, the scheduling strategy in step 3 comprises maintaining an access queue, the access queue is a semi-sorted doubly linked list for tracking access heat of all slices uploaded to the video memory, a slice order of the access queue indicates whether the uploaded slices have been recently accessed, and slices arranged at an end of the access queue have lower access heat, that is, idle for a long time without being actually accessed.

Further, the scheduling strategy in the step 3 comprises maintaining an update queue, the update queue is a doubly linked list for tracking missing slices in current rendering, and the update queue always indicates a slice information that is currently and immediately scheduled; the update queue only maintains and stores indication information of a slice, not slice data itself.

Further, the scheduling strategy in the step 3 comprises maintaining a prediction queue, the prediction queue calculates slice data that needs to be preloaded via a prediction algorithm when a current operation is not intensive, to make full use of an idle period for data exchange.

The invention can realize the rendering of gigabit pixels on a conventional device platform (a conventional personal computer within ten thousand yuan). The memory/video memory space configuration required by this method is also much smaller than the gigabit image size of the actual rendering target. Using the conventional method to complete the rendering of mega-level pixels requires more than 40G of video memory, and the method provided by the present invention can reduce the video memory occupation to 1G to 4G.

These and other objectives of the present invention will no doubt become obvious to those of ordinary skill in the art after reading the following detailed description of the preferred embodiment that is illustrated in the various FIGURES and drawings.

BRIEF DESCRIPTION OF THE DRAWINGS

FIG. 1 is a control flowchart of a preferred embodiment of the present invention.

DETAILED DESCRIPTION

The following describes specific embodiments of the present invention with reference to the accompanying drawings of the specification to make the technical content more clear and easy to understand. The present invention can be implemented by many different forms of embodiments, and the protection scope of the present invention is not limited to the embodiments mentioned in the text.

The invention provides a real-time rendering method of a gigabit pixel image, which specifically includes the following steps:

Step 1: Perform offline data reorganization on the image through a data pre-processing module, and utilize reorganized data to generate a data file with an extension name ".giga".

The starting point of data reorganization is based on the consideration of reducing memory consumption and optimizing rendering strategies, focusing on the optimization of the following three hierarchical structures:

1) Apply image filling and slicing scheme, and on the premise of estimating the slice size, divide a large image into small parts for faster loading and rendering at a software level;

2) Adopt a file structure based on a memory hierarchy structure, to significantly reduce rendering costs through optimization;

3) Adopt a slice relocation scheme, and use a cache at a system level to improve the local characteristics of slice data and further reduce the access time.

In our slicing scheme, all slices at different scaling levels have the same amount of data, that is, the same size. For the original-scale data image, we reduce it according to a certain scaling factor (the preferred scaling factor in this embodiment is 2), and the result of each scaling is a scaling level image. The global slice size is the image size of a certain scaling level selected after considering the memory bandwidth. We set this scaling level to level 0 and the final original image to level n. Then the width and height of each scaling level image can be guaranteed to be a positive integer multiple of the global slice size, that is, each scaling level can be guaranteed to be cut into a series of slices of a uniform size. From scaling level 0 to scaling level n, a stable pyramid-shaped slice structure is formed.

In the actual storage of sliced data, the sliced data is stored in order from the scaling level 0, and before the overall data, specific data parameters are additionally stored. In order to optimize the reading of memory by modern computers, we fill certain invalid placeholder data to make sure that the memory offset position of each slice is kept at an integer multiple of 4 KiB, which can maximize the use of the structural characteristics of memory page reading.

Finally, the reorganized data is generated into a file with an extension name .giga for use by the real-time renderer.

Step 2: Perform data decoding and redirection of the data file through a data decoding module;

In practical applications, by using the slicing rule described in step 1, the starting position of the t-th slice data at any scaling level l can be quickly located by the following formula:

$$o_{t,l} = (o_l + t) \times s$$

where $o_{t,l}$ is the starting position of the t-th slice data at scaling level l, $o_l$ is the starting position offset of the 0th slice at scaling level l, and s is a memory space occupied by the global slice size after aligning 4 KiB.

$o_l$ can be calculated in advance by the following formula:

$$o_l = \sum_{i=0}^{l-1} \mu^{2i}$$
$$= \begin{cases} 0 & l = 0 \\ o_{l-1} + \mu^{2(l-1)} & l \neq 0 \end{cases}$$

Among them, l is the scaling level, $o_l$ is the starting position offset of the 0th slice under the scaling level l, and μ is the scaling factor.

In order to be able to confirm the mapping of the required module in real-time rendering, we generate some sampling points uniformly along each dimension of the image. Correspond each of these points according to the relationship of each adjacent diagonals, and record the coordinate difference along the axis in pairs, and record it as $w_i, h_i$. Then, back-projection calculation is performed on the coordinates to obtain the coordinates corresponding to the texture coordinate system of each sampling point, and another set of coordinate differences $w'_i, h'_i$ is obtained. Then, for each pair of sampling points (i, j), the corresponding slice id can be calculated by the following methods, and they are written as $(l_i, id_i)$ and $(l_j, id_j)$.

First calculate the scaling ratio between screen coordinates and texture coordinates to get the scaling level:

$$r = \max\left(\frac{w'_i}{w_i}, \frac{h'_i}{h_i}\right)$$
$$l = \text{clip}(\lfloor(n - 1 - \log^r_\mu)\rfloor, 0, n - 1)$$

Among them, r is the scaling ratio between screen coordinates and texture coordinates, max ( ) is the maximum operator, l is the scaling level, and clip ( ) is the slice operator, $\lfloor \ \rfloor$ is the floor operator, μ is the scaling factor and n is the total scaling level.

According to the calculated scaling level l, the ids corresponding to the two points can be calculated in turn:

$$id_{ix} = \left\lfloor \frac{i_x}{h'_l} \right\rfloor$$
$$id_{iy} = \left\lfloor \frac{i_y}{w'_l} \right\rfloor$$
$$id = id_{iy} + id_{ix} \times \mu^l$$

Among them, $h'_l$ and $w'_l$ are the range size of the original image covered by the next slice of the scaling level l stored by calculation in advance, l is the scaling level, and μ is the scaling factor, and $\lfloor \ \rfloor$ is the floor operator.

By calculation in advance and storing basic parameter information of each scaling level l, the redirection operation can be accelerated.

Step 3: Generate a scheduling strategy through a scheduling module to determine a queue status of data in a memory and a video memory;

Step 4: Execute the scheduling strategy through a rendering module, and update the scheduling strategy during execution;

Step 5: Repeat the steps 3 and 4 until the entire image is rendered.

Data processing is often a balance of storage capacity and performance. In memory data management, image mapping is the smallest unit of operation between video memory and memory disk. The renderer needs to load the slice data into the memory first, and then uploads it to the video memory, and then the graphics card can calculate and finally render the desired result. In the scheduling strategy, the scheduling module needs to determine the video memory bit table, access queue, update queue, and prediction queue in order to perform reasonable and effective data scheduling operations between video memory and memory disks:

Video memory bit table: Video memory is divided into a set of available video memory bits. The scheduling module maintains this video memory bit table to record slice information specifically stored by each video memory bit: such as the slice number, whether the video memory bit is empty, and whether it needs to be rendered.

Access queue: The access queue is a semi-sorted doubly linked list, which is used to track the access heat of all the slices uploaded to the video memory. The slice order of the access queue indicates whether the uploaded slices has been accessed recently, and slices arranged at the end of the access queue has a lower access heat (that is, idle for a long time without being actually visited).

Update queue: The update queue is a doubly linked list used to track missing slices in the current rendering. Since the slices are uploaded to different video memory bits at different times, when each viewpoint is rendered, some of the series of slices may have been stored in the video memory, and the remaining slices need to be considered by the scheduler to perform upload operations to update video memory data, these slices will be stored in the update queue. Unlike long-term maintained data such as the video memory bit table or the access queue, the update queue is one-time, and it is always emptied before a calculation cycle of calculating slice of each point sampling back-projection. So the update queue will always indicate the slice information currently and immediately scheduled. It should be emphasized that the update queue only maintains and stores indication information of a slice, not slice data itself.

Prediction queue: The prediction queue and the update queue have similar data structures and meanings. The only difference is that the prediction queue does not store slices that need to be currently rendered, but calculates the slices via a certain prediction algorithm. The slices of the prediction queue have lower priority than the update queue, so when the upload task is intensive, the prediction queue may be suspended, so that the slices in it may not be eventually uploaded to the video memory. The design of the prediction queue is that when operations are not intensive, this idle period can be fully used to continue data exchange, to preload possible slice data.

After the renderer obtains the video memory bit table, access queue, update queue, and prediction queue determined by the scheduling module, it performs rendering operations based on the loaded queue information, and returns the updated sampling point coordinates to the rendering module, so that the rendering module can start the calculation of the next cycle to get the video memory bit table, access queue, update queue and prediction queue of the next cycle. Until the image rendering is complete.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for real-time rendering of a gigabit pixel image, comprising following steps:
   step 1: performing offline data reorganization on the image through a data pre-processing module, and utilizing reorganized data to generate a data file with an extension name ".giga";
   Step 2: performing data decoding and redirection of the data file through a data decoding module;
   Step 3: generating a scheduling strategy through a scheduling module to determine a queue status of data in a memory and a video memory;
   Step 4: executing the scheduling strategy through a rendering module, and updating the scheduling strategy during execution;
   Step 5: repeating the steps 3 and 4 until the entire image is rendered.

2. The method for real-time rendering of the gigabit pixel image of claim 1, wherein the data reorganization in the step 1 comprises image slicing, image filling, and file structure optimization; the image slicing divides a large image into small parts for faster loading and rendering at a software level; the image filling is adds specific data parameters before an overall data storage, and uses invalid placeholder data to ensure a memory offset position for each slice remains an integer multiple of 4 KiB; the file structure optimization adopts a file structure based on a memory hierarchy structure, to significantly reduces rendering costs through optimization.

3. The method for real-time rendering of the gigabit pixel image of claim 2, wherein a specific scheme of the image slicing is to reduce an original-scale data image by a factor of two, and a result of each scaling is a scaling level image, a scaling level that is most suitable for a memory bandwidth is selected and defined as a scaling level 0, and each image of each scaling level is cut into a series of slices of a uniform size.

4. The method for real-time rendering of the gigabit pixel image of claim 2, wherein the data decoding and the redirection in the step 2 comprises establishing a scaling level table, that is, storing a starting position offset of each slice data at any scaling levels in advance, thereby increasing a speed of operation of the redirection.

5. The method for real-time rendering of the gigabit pixel image of claim 4, wherein, at a specific scaling level, a starting position offset of an 0th slice data is calculated by a following formula:

$$o_l = \sum_{i=0}^{l-1} \mu^{2i}$$

$$= \begin{cases} 0 & l = 0 \\ o_{l-1} + \mu^{2(l-1)} & l \neq 0 \end{cases}$$

among them, l is a scaling level, $o_l$ is the starting position offset of the 0th slice under the scaling level l, and μ is a scaling factor.

6. The method for real-time rendering of the gigabit pixel image of claim 5, wherein, at the specific scaling level, a starting position offset of a t-th slice is calculated by a following formula:

$$o_{t,l} = (o_l + t) \times s$$

where $o_{t,l}$ is the starting position of the t-th slice data at a scaling level l, $o_l$ is the starting position offset of the 0th slice at the scaling level l, and s is a memory space occupied by a global slice size after aligning 4 KiB.

7. The method for real-time rendering of gigabit pixel image of claim 2, wherein the scheduling strategy in the step 3 comprises maintaining a video memory bit table, and the video memory bit table divides the video memory into a set of available video memory bits, the video memory bit table records slice information specifically stored by each video memory bit, the slice information comprises a slice number, whether the video memory bit is empty, and whether the video memory bit needs to be rendered.

8. The method for real-time rendering of the gigabit pixel image of claim 2, wherein the scheduling strategy in step 3 comprises maintaining an access queue, the access queue is a semi-sorted doubly linked list for tracking access heat of all slices uploaded to the video memory, a slice order of the access queue indicates whether the uploaded slices have been recently accessed, and slices arranged at an end of the access queue have lower access heat, that is, idle for a long time without being actually accessed.

9. The method for real-time rendering of the gigabit pixel image of claim 2, wherein the scheduling strategy in the step 3 comprises maintaining an update queue, the update queue is a doubly linked list for tracking missing slices in current rendering, and the update queue always indicates a slice information that is currently and immediately scheduled; the update queue only maintains and stores indication information of a slice, not slice data itself.

10. The method for real-time rendering of gigabit pixel image of claim 2, wherein the scheduling strategy in the step 3 comprises maintaining a prediction queue, the prediction queue calculates slice data that needs to be preloaded via a prediction algorithm when a current operation is not intensive, to make full use of an idle period for data exchange.

* * * * *